United States Patent
Takahashi et al.

(10) Patent No.: US 12,230,788 B2
(45) Date of Patent: Feb. 18, 2025

(54) NONAQUEOUS ELECTROLYTE SECONDARY BATTERY

(71) Applicant: Prime Planet Energy & Solutions, Inc., Tokyo (JP)

(72) Inventors: Keiichi Takahashi, Nishinomiya (JP); Ryo Hanazaki, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 509 days.

(21) Appl. No.: 17/578,471

(22) Filed: Jan. 19, 2022

(65) Prior Publication Data
US 2022/0238865 A1     Jul. 28, 2022

(30) Foreign Application Priority Data
Jan. 21, 2021   (JP) ................................. 2021-007921

(51) Int. Cl.
| | |
|---|---|
| *H01M 4/36* | (2006.01) |
| *H01M 4/505* | (2010.01) |
| *H01M 4/525* | (2010.01) |
| *H01M 4/02* | (2006.01) |

(52) U.S. Cl.
CPC ........... *H01M 4/366* (2013.01); *H01M 4/505* (2013.01); *H01M 4/525* (2013.01); *H01M 2004/021* (2013.01); *H01M 2004/028* (2013.01); *H01M 2220/20* (2013.01)

(58) Field of Classification Search
CPC ...... H01M 4/366; H01M 4/505; H01M 4/525; H01M 2004/021; H01M 2004/028
USPC ......................................................... 429/220
See application file for complete search history.

(56) References Cited

U.S. PATENT DOCUMENTS

| | | |
|---|---|---|
| 2010/0019194 A1 | 1/2010 | Fujiwara et al. |
| 2010/0081055 A1 | 4/2010 | Konishi et al. |
| 2013/0149604 A1 | 6/2013 | Fujiki et al. |

(Continued)

FOREIGN PATENT DOCUMENTS

| | | |
|---|---|---|
| CN | 101584062 A | 11/2009 |
| CN | 101714630 A | 5/2010 |

(Continued)

*Primary Examiner* — James M Erwin
*Assistant Examiner* — Kevin Nguyen
(74) *Attorney, Agent, or Firm* — HAUPTMAN HAM, LLP (57) ABSTRACT

A nonaqueous electrolyte secondary battery includes a positive electrode. The positive electrode includes a positive electrode active material layer. The positive electrode active material layer includes a first layer and a second layer. The first layer includes a first particle group. The second layer includes a mixture of a second particle group and a third particle group. The first particle group consists of a plurality of first positive electrode active material particles. The second particle group consists of a plurality of second positive electrode active material particles. The third particle group consists of a plurality of third positive electrode active material particles. Each of the first positive electrode active material particles and the third positive electrode active material particles independently includes 1 to 10 single-particles. Each of the second positive electrode active material particles includes secondary particles obtained by aggregation of 50 or more primary particles.

5 Claims, 4 Drawing Sheets

(56) References Cited

U.S. PATENT DOCUMENTS

| | | | |
|---|---|---|---|
| 2016/0013480 A1* | 1/2016 | Sikha | H01M 4/043 |
| | | | 427/126.6 |
| 2018/0123118 A1 | 5/2018 | Furuichi et al. | |
| 2018/0287209 A1* | 10/2018 | Hasegawa | H01M 10/0413 |
| 2019/0020024 A1* | 1/2019 | Wang | C01G 53/50 |
| 2020/0083524 A1* | 3/2020 | Baek | H01M 4/587 |
| 2020/0127276 A1* | 4/2020 | Kim | H01M 10/052 |
| 2021/0313563 A1 | 10/2021 | Guo et al. | |
| 2022/0109141 A1 | 4/2022 | Takahashi et al. | |
| 2022/0115648 A1 | 4/2022 | Hanazaki et al. | |

FOREIGN PATENT DOCUMENTS

| | | | |
|---|---|---|---|
| CN | 103165935 A | 6/2013 | |
| CN | 107534144 A | 1/2018 | |
| CN | 110429252 A | 11/2019 | |
| EP | 3889112 A1 | 10/2021 | |
| EP | 4099430 A1 | 12/2022 | |
| JP | 2003217582 A | 7/2003 | |
| JP | 2013-65468 A | 4/2013 | |
| JP | 2013-120724 A | 6/2013 | |
| JP | 2013149403 A | 8/2013 | |
| JP | 5973167 B2 * | 8/2016 | H01M 4/505 |
| JP | 2019140039 A | 8/2019 | |
| JP | 202087879 A | 6/2020 | |
| JP | 2022-515014 A | 2/2022 | |
| JP | 2022-60686 A | 4/2022 | |
| JP | 2022-63677 A | 4/2022 | |
| WO | 2021153290 A1 | 8/2021 | |

* cited by examiner

NONAQUEOUS ELECTROLYTE SECONDARY BATTERY

This nonprovisional application is based on Japanese Patent Application No. 2021-007921 filed on Jan. 21, 2021, with the Japan Patent Office, the entire contents of which are hereby incorporated by reference.

BACKGROUND OF THE INVENTION

Field of the Invention

The present technology relates to a nonaqueous electrolyte secondary battery.

Description of the Background Art

Japanese Patent Laying-Open No. 2020-087879 discloses a lithium metal composite oxide powder composed of: secondary particles formed by aggregation of primary particles; and single-particles.

SUMMARY OF THE INVENTION

Generally, in a nonaqueous electrolyte secondary battery (hereinafter, also simply referred to as "battery"), a positive electrode active material is a particle group. For example, a positive electrode active material layer including a positive electrode active material is disposed on a surface of a positive electrode substrate. By compressing the positive electrode active material layer, energy density is increased.

In order to improve a packing characteristic of the positive electrode active material, it is considered to mix aggregated particles with single-particles, for example. The aggregated particles are secondary particles formed by aggregation of fine primary particles. The single-particles are primary particles grown to be comparatively large. A mixture of the aggregated particles and the single-particles tends to have an excellent packing characteristic. However, there is room for improvement in fusing performance in a nail penetration test. The term "fusing" in the present specification indicates a phenomenon in which short-circuit current is interrupted by a positive electrode substrate (a metal foil or the like) being melt and spread during the nail penetration test. As a time from occurrence of a short circuit to occurrence of fusing is shorter, the fusing performance is more excellent.

For example, since the positive electrode substrate is locally thin at a portion at which the positive electrode active material (particles) bite into the positive electrode substrate, the fusing is likely to occur. When the positive electrode active material is a mixture of aggregated particles and single-particles, the positive electrode active material tends to be less likely to bite into the positive electrode substrate. Therefore, occurrence of fusing may take time.

An object of the present technology is to attain both packing characteristic and fusing performance.

Hereinafter, configurations, functions, and effects of the present technology will be described. However, a mechanism of function in the present specification includes presumption. The scope of the present technology is not limited to the mechanism of function.

[1] A nonaqueous electrolyte secondary battery includes a positive electrode, a negative electrode, and an electrolyte solution. The positive electrode includes a positive electrode substrate and a positive electrode active material layer. The positive electrode active material layer is disposed on a surface of the positive electrode substrate. The positive electrode active material layer includes a first layer and a second layer. The first layer is disposed between the second layer and the positive electrode substrate. The first layer includes a first particle group as a main active material. The second layer includes a mixture of a second particle group and a third particle group. The second particle group is a main active material of the second layer. The first particle group consists of a plurality of first positive electrode active material particles. The second particle group consists of a plurality of second positive electrode active material particles. The third particle group consists of a plurality of third positive electrode active material particles. Each of the first positive electrode active material particles and the third positive electrode active material particles independently includes 1 to 10 single-particles. Each of the second positive electrode active material particles includes a secondary particle obtained by aggregation of 50 or more primary particles.

The positive electrode active material layer of the present technology has a multilayer structure. That is, the positive electrode active material layer includes the first layer (lower layer) and the second layer (upper layer). The upper layer is disposed on the surface side of the positive electrode active material layer with respect to the lower layer. The lower layer is disposed on the positive electrode substrate side with respect to the upper layer.

The lower layer is mainly composed of single-particles (first positive electrode active material particles). The single-particles tend to be more likely to bite into the positive electrode substrate as compared with the aggregated particles. Since the lower layer is mainly composed of the single-particles, it is expected to improve the fusing performance.

The upper layer is composed of the mixture of the aggregated particles and the single-particles (the second positive electrode active material particles and the third positive electrode active material particles). Thus, the positive electrode active material layer can have a desired packing characteristic.

When the positive electrode active material layer is compressed, stress tends to be concentrated on the upper layer. For example, when the upper layer is composed only of aggregated particles, the aggregated particles may be cracked. When the aggregated particles are cracked in the vicinity of the surface of the positive electrode active material layer, an electrolyte solution can be hindered from entering and exiting the positive electrode active material layer. As a result, cycle durability may be decreased, for example. Since the upper layer includes the single-particles in addition to the aggregated particles, the packing characteristic can be improved, thereby reducing cracking of the aggregated particles. As a result, it is expected to improve the cycle durability, for example.

[2] In the battery of [1], each of the first positive electrode active material particles, the second positive electrode active material particles, and the third positive electrode active material particles may independently include a lamellar metal oxide.

The lamellar metal oxide may be represented by, for example, the following formula (1):

$$Li_{i-a}Ni_xMe_{1-x}O_2 \qquad (1),$$

where

"a" satisfies a relation of $-0.3 \leq a \leq 0.3$,

"x" satisfies a relation of $0.7 \leq x \leq 1.0$, and

"Me" represents at least one selected from a group consisting of cobalt (Co), manganese (Mn), aluminum (Al), zirconium (Zr), boron (B), magnesium (Mg), iron (Fe), copper (Cu), zinc (Zn), tin (Sn), sodium (Na), potassium (K), barium (Ba), strontium (Sr), calcium (Ca), tungsten (W), molybdenum (Mo), niobium (Nb), titanium (Ti), silicon (Si), vanadium (V), chromium (Cr), and germanium (Ge).

[3] In the battery of [1] or [2], the first particle group may have a bite ratio of for example, 9.3% to 21.3%. The bite ratio is found by the following formula (2):

$$B(\%) = d/t \times 100 \quad (2),$$ where

"B" represents the bite ratio,

"d" represents an average value of depths of portions of the positive electrode substrate, the portions of the positive electrode substrate being portions into which the first positive electrode active material particles bite in a thickness direction of the positive electrode substrate, and "t" represents a thickness of the positive electrode substrate.

Since the bite ratio is more than or equal to 9.3%, it is expected to improve the fusing performance. When the bite ratio is more than 21.3%, the strength of the positive electrode substrate may be decreased. This may cause a trouble in an operation of welding the positive electrode substrate to a positive electrode current collecting member, for example.

[4] In the battery of [1] to [3], the first particle group may have a sphericity of, for example, 0.75 to 0.87.

Particles having shapes irregular to some extent, rather than particles having shapes close to exact spheres, tend to be likely to bite into the positive electrode substrate. When the first particle group has a sphericity of 0.75 to 0.87, a desired bite ratio tends to be likely to be obtained.

[5] In the battery of [1] to [4], the mixture of the second particle group and the third particle group may have a flow function coefficient of more than or equal to 2.9, for example.

The term "flow function coefficient ($ff_c$)" in the present specification can be an index of the packing characteristic. It is considered that the packing characteristic is more excellent as the value of $ff_c$ is larger. The $ff_c$ is a ratio of a maximum principal stress ($\sigma_1$) to a uniaxial collapse stress ($f_c$). The $ff_c$ is measured by a direct shear test for powders. Conventionally, the Carr's flowability index has been commonly used as an index of a packing characteristic of a powder. The $ff_c$ reflects a packing behavior of the positive electrode active material more excellently than the Carr's flowability index. This is presumably due to the following reason: external force applied to the positive electrode active material in the event of compression is not taken into consideration in the Carr's flowability index, whereas external force applied to the positive electrode active material in the event of compression is taken into consideration in the $ff_c$. When the mixture (that is, the upper layer) of the second particle group and the third particle group has an $ff_c$ of more than or equal to 2.9, it is expected to improve the packing characteristic of the positive electrode active material layer.

[6] In the battery of [1] to [5], a ratio of a thickness of the second layer to a thickness of the positive electrode active material layer may be, for example, 0.25 to 0.75.

In the present specification, the "ratio of the thickness of the second layer to the thickness of the positive electrode active material layer" is also referred to as "thickness ratio". When the thickness ratio is 0.25 to 0.75, balance tends to be excellent between the fusing performance and the cycle durability, for example.

The foregoing and other objects, features, aspects and advantages of the present technology will become more apparent from the following detailed description of the present technology when taken in conjunction with the accompanying drawings.

DESCRIPTION OF THE PREFERRED EMBODIMENTS

Hereinafter, an embodiment (also referred to as "the present embodiment" in the present specification) of the present technology will be described. However, the scope of the present technology is not restricted by the following description.

In the present specification, expressions such as "comprise", "include", and "have" as well as their variants (such as "be composed of", "encompass", "involve", "contain", "carry", "support", and "hold") are open-end expressions. Each of the open-end expressions may or may not further include additional element(s) in addition to essential element(s). The expression "consist of" is a closed expression. The expression "consist essentially of" is a semi-closed expression. The semi-closed expression may further include additional element(s) in addition to essential element(s) as long as the object of the present technology is not compromised. For example, a normally conceivable element (such as an inevitable impurity) in the field to which the present technology belongs may be included as an additional element.

In the present specification, each of the words "may" and "can" is used in a permissible sense, i.e., "have a possibility to do", rather than in a mandatory sense, i.e., "must do".

In the present specification, singular forms ("a", "an", and "the") may include plural forms as well, unless otherwise stated particularly.

In the present specification, when a compound is expressed by a stoichiometric composition formula such as "$LiCoO_2$", the stoichiometric composition formula merely indicates a representative example. The composition ratio may be non-stoichiometric. For example, when a lithium cobaltate is expressed as "$LiCoO_2$", the lithium cobaltate is not limited to a composition ratio of "Li/Co/O=1/1/2" unless otherwise stated particularly, and can include Li, Co, and O at any composition ratio.

In the present specification, a numerical range such as "1 to 10" and "1-10" includes the lower and upper limit values unless otherwise stated particularly. That is, each of the expressions "1 to 10" and "1-10" represents a numerical range of "more than or equal to 1 and less than or equal to 10". Further, numerical values freely selected from the numerical range may be employed as new lower and upper limit values. For example, a new numerical range may be set by freely combining a numerical value described in the numerical range with a numerical value described in another portion of the present specification.

Geometric terms in the present specification (for example, the terms such as "parallel" and "perpendicular") should not be interpreted in a strict sense. For example, the term "parallel" may be deviated to some extent from the strict definition of the term "parallel". The geometric terms in the present specification can include, for example, a tolerance, an error, and the like in terms of design, operation, manufacturing, and the like. A dimensional relation in each of the figures may not coincide with an actual dimensional relation. In order to facilitate understanding of the present technology, the dimensional relation (length, width, thickness, or the like) in each figure may be changed. Further, part of configurations may be omitted.

<Nonaqueous Electrolyte Secondary Battery>

Figure 1:
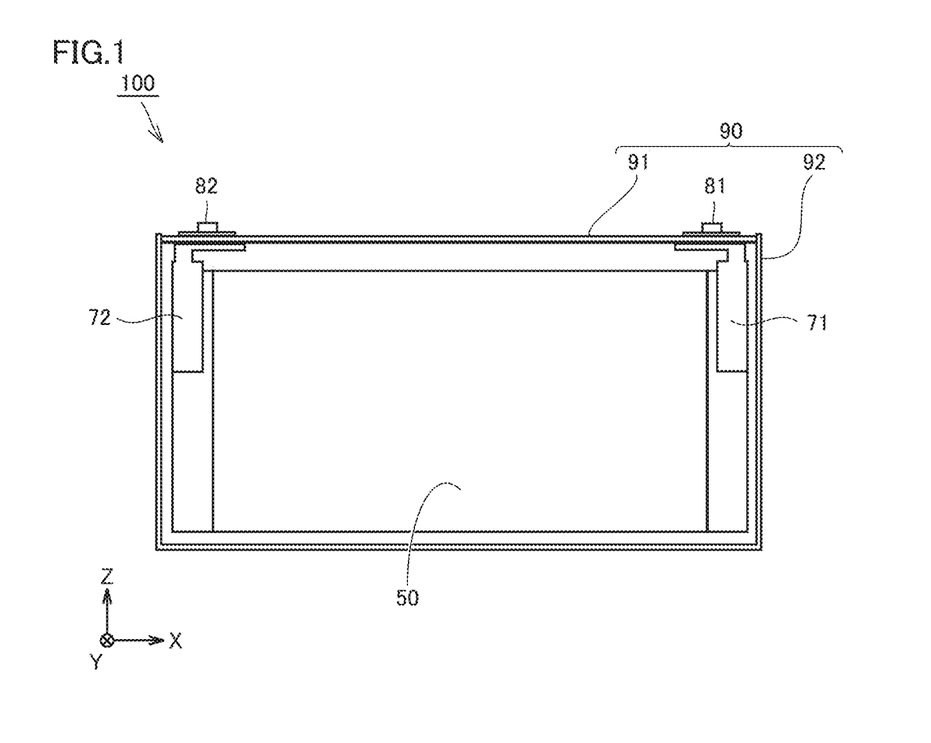
FIG. 1 is a schematic diagram showing an exemplary configuration of a nonaqueous electrolyte secondary battery in the present embodiment.

FIG. 1 is a schematic diagram showing an exemplary configuration of nonaqueous electrolyte secondary battery in the present embodiment.

Battery 100 can be used for any purpose of use. Battery 100 may be used as a main electric power supply or a motive power assisting electric power supply in an electrically powered vehicle, for example. A plurality of batteries 100 may be coupled to form a battery module or a battery pack.

Battery 100 includes an exterior package 90. Exterior package 90 has a prismatic shape (flat rectangular parallelepiped shape). However, the prismatic shape is exemplary. Exterior package 90 may have any shape. Exterior package 90 may have, for example, a cylindrical shape or a pouch shape. Exterior package 90 may be composed of, for example, an Al alloy. Exterior package 90 stores an electrode assembly 50 and an electrolyte solution (not shown). Exterior package 90 may include, for example, a sealing plate 91 and an exterior container 92. Sealing plate 91 closes the opening of exterior container 92. For example, sealing plate 91 and exterior container 92 may be joined to each other by laser welding.

A positive electrode terminal 81 and a negative electrode terminal 82 are provided on sealing plate 91. Sealing plate 91 may be further provided with an injection opening and a gas discharge valve. The electrolyte solution can be injected from the injection opening to inside of exterior package 90. Electrode assembly 50 is connected to positive electrode terminal 81 by a positive electrode current collecting member 71. Positive electrode current collecting member 71 may be, for example, an Al plate or the like. Electrode assembly 50 is connected to negative electrode terminal 82 by a negative electrode current collecting member 72. Negative electrode current collecting member 72 may be, for example, a Cu plate or the like.

Figure 2:
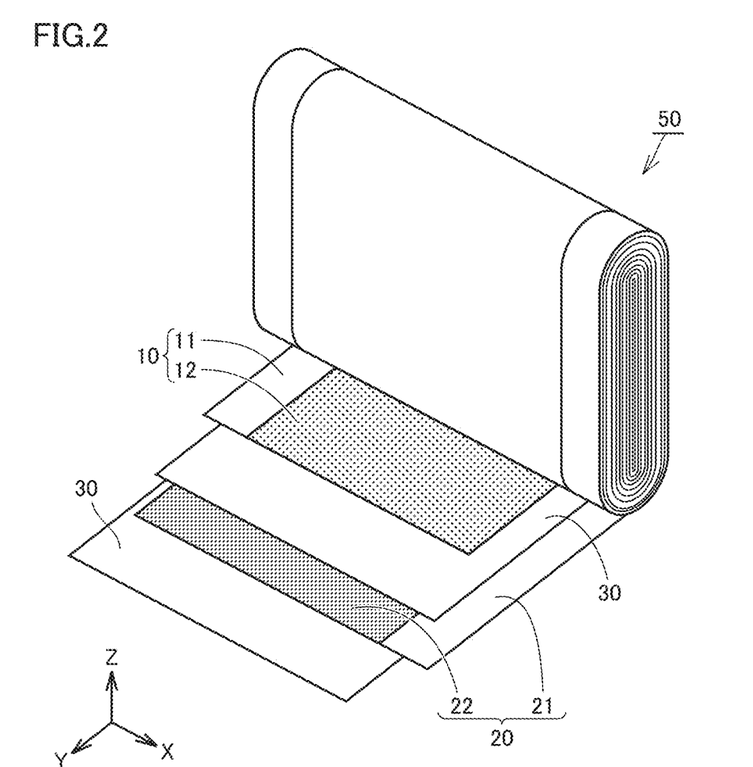
FIG. 2 is a schematic diagram showing an exemplary configuration of an electrode assembly in the present embodiment.

FIG. 2 is a schematic diagram showing an exemplary configuration of the electrode assembly in the present embodiment.

Electrode assembly 50 is of a wound type. Electrode assembly 50 includes a positive electrode 10, separator(s) 30, and a negative electrode 20. That is, battery 100 includes a positive electrode 10, a negative electrode 20, and the electrolyte solution. Each of positive electrode 10, separator(s) 30, and negative electrode 20 is a sheet in the form of a strip. Electrode assembly 50 may include a plurality of separators 30. Electrode assembly 50 is formed by layering positive electrode 10, separator 30, and negative electrode 20 in this order and winding them spirally. One of positive electrode 10 or negative electrode 20 may be interposed between separators 30. Both positive electrode 10 and negative electrode 20 may be interposed between separators 30. Electrode assembly 50 may be shaped to have a flat shape after the winding. It should be noted that the wound type is exemplary. Electrode assembly 50 may be, for example, of a stack type.

<<Positive Electrode>>

Positive electrode 10 includes a positive electrode substrate 11 and a positive electrode active material layer 12. Positive electrode substrate 11 is an electrically conductive sheet. Positive electrode substrate 11 may be, for example, an Al alloy foil or the like. Positive electrode substrate 11 may have a thickness of, for example, 10 µm to 30 µm. Positive electrode active material layer 12 is disposed on a surface of positive electrode substrate 11. Positive electrode active material layer 12 may be disposed only on one surface of positive electrode substrate 11, for example. Positive electrode active material layer 12 may be disposed on each of the front and rear surfaces of positive electrode substrate 11, for example. Positive electrode substrate 11 may be exposed at one end portion in the width direction of positive electrode 10 (X axis direction in FIG. 2). Positive electrode current collecting member 71 can be joined to the exposed portion of positive electrode substrate 11.

For example, an intermediate layer (not shown) may be formed between positive electrode active material layer 12 and positive electrode substrate 11. In the present embodiment, also when the intermediate layer is present, positive electrode active material layer 12 is regarded as being disposed on the surface of positive electrode substrate 11. The intermediate layer may be thinner than positive electrode active material layer 12. The intermediate layer may have a thickness of 0.1 µm to 10 µm, for example. The intermediate layer may include, for example, a conductive material, an insulating material, or the like.

(Positive Electrode Active Material Layer)

Positive electrode active material layer 12 may have a thickness of, for example, 10 µm to 200 µm. Positive electrode active material layer 12 may have a thickness of, for example, 50 µm to 150 µm. Positive electrode active material layer 12 may have a thickness of, for example, 50 µm to 100 µm.

Positive electrode active material layer 12 includes a positive electrode active material. The positive electrode active material is a particle group. Positive electrode active material layer 12 may further include an additional component as long as the positive electrode active material is included. Positive electrode active material layer 12 may include, for example, a conductive material, a binder, or the like in addition to the positive electrode active material. The conductive material can include any component. For example, the conductive material may include at least one selected from a group consisting of carbon black, graphite, vapor-grown carbon fiber (VGCF), carbon nanotube (CNT), and graphene flake. A blending amount of the conductive material may be, for example, 0.1 part by mass to 10 parts by mass with respect to 100 parts by mass of the positive electrode active material. The binder can include any component. For example, the binder may include at least one selected from a group consisting of polyvinylidene difluoride (PVdF), poly(vinylidene fluoride-co-hexafluoropropylene) (PVdF-HFP), polytetrafluoroethylene (PTFE), and polyacrylic acid (PAA). A blending amount of the binder may be, for example, 0.1 part by mass to 10 parts by mass with respect to 100 parts by mass of the positive electrode active material.

Positive electrode active material layer 12 can have a high density. Positive electrode active material layer 12 may have a density of 3.6 g/cm³ to 3.9 g/cm³, for example. Positive electrode active material layer 12 may have a density of 3.65 g/cm³ to 3.81 g/cm³, for example. Positive electrode active material layer 12 may have a density of 3.70 g/cm³ to 3.81 g/cm³, for example. The density of the active material layer in the present specification represents an apparent density.

(Multilayer Structure)

Figure 3:
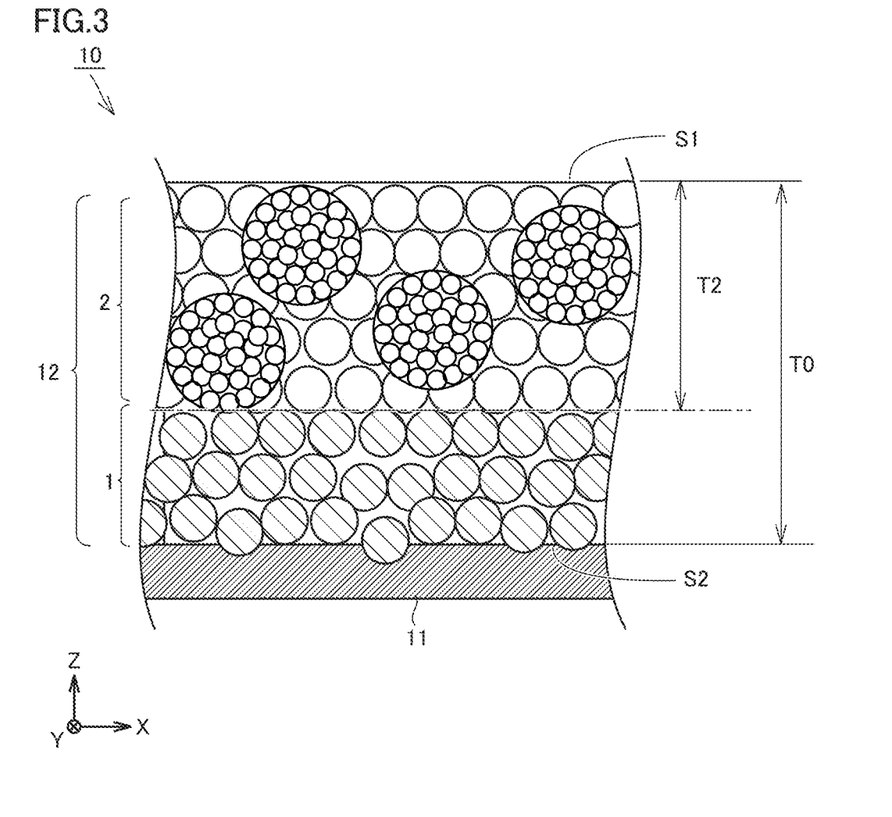
FIG. 3 is a conceptual diagram showing a positive electrode in the present embodiment.

FIG. 3 is a conceptual diagram showing a positive electrode in the present embodiment.

Positive electrode active material layer 12 includes a first layer 1 and a second layer 2. First layer 1 is disposed between second layer 2 and positive electrode substrate 11. Each of first layer 1 and second layer 2 can be formed independently by applying a slurry, for example. First layer 1 and second layer 2 may be formed one after the other. First layer 1 and second layer 2 may be formed substantially simultaneously.

Positive electrode active material layer 12 may further include an additional layer (not shown) as long as first layer 1 and second layer 2 are included therein. The additional layer has a composition different from those of first layer 1 and second layer 2. For example, the additional layer may be formed between first layer 1 and second layer 2. For example, the additional layer may be formed between first layer 1 and positive electrode substrate 11. For example, the additional layer may be formed between the surface of positive electrode active material layer 12 and second layer 2.

First layer 1 is, in other words, a "lower layer". First layer 1 is disposed on the positive electrode substrate 11 side with respect to second layer 2. First layer 1 may be in contact with the surface of positive electrode substrate 11. Second layer 2 is, in other words, an "upper layer". Second layer 2 is disposed on the surface side of positive electrode active material layer 12 with respect to first layer 1. Second layer 2 may form the surface of positive electrode active material layer 12.

First layer 1 is mainly composed of single-particles. That is, first layer 1 includes a first particle group as a main active material. First layer 1 may further include an additional particle group as long as the first particle group is included therein as the main active material. Since the lower layer is mainly composed of the single-particles, it is expected to improve the fusing performance.

Second layer 2 is composed of a mixture of aggregated particles and single-particles. That is, second layer 2 includes a second particle group and a third particle group. The second particle group is a main active material of second layer 2. Second layer 2 may further include an additional particle group as long as the second particle group and the third particle group are included therein. Since the upper layer is composed of the mixture of the aggregated particles and the single-particles, it is expected to improve the packing characteristic.

The "main active material" in the present specification has the maximum mass fraction in the positive electrode active material included in the target layer. For example, when the positive electrode active material consists of a particle group α having a mass fraction of 40%, a particle group β having a mass fraction of 30%, and a particle group γ having a mass fraction of 30% in the target layer, particle group α is regarded as the main active material. For example, the main active material may have a mass fraction of more than or equal to 40%, a mass fraction of more than or equal to 50%, a mass fraction of more than or equal to 60%, a mass fraction of more than or equal to 70%, a mass fraction of more than or equal to 80%, a mass fraction of more than or equal to 90%, or a mass fraction of 100% with respect to the whole of the positive electrode active material included in the target layer. It should be noted that when there are a plurality of particle groups having the maximum mass fraction, a plurality of main active materials can be present. For example, when the positive electrode active material consists of a particle group α having a mass fraction of 50% and a particle group β having a mass fraction of 50%, each of particle group α and particle group β is regarded as the main active material.

(First Particle Group/First Positive Electrode Active Material Particles/Single-Particles)

The first particle group consists of the plurality of first positive electrode active material particles. Each of the first positive electrode active material particles can have any shape. The first positive electrode active material particle may have a spherical shape, a columnar shape, a lump-like shape, or the like, for example. The plurality of first positive electrode active material particles may have a first average particle size of, for example, 0.5 μm to 10 μm. The first average particle size is measured in a SEM (scanning electron microscope) image of the first particle group. The "average particle size" in the present embodiment represents an average value of the Feret diameter in the SEM image. The average value represents the arithmetic average of 100 or more particles. The plurality of first positive electrode active material particles may have a first average particle size of 1 μm to 7 μm, for example.

Each of the first positive electrode active material particles includes 1 to 10 single-particles. Each of the single-particles is a primary particle grown to be relatively large. In the present specification, the single-particle may be also referred to as "sc (single-crystal)". The "single-particle" represents a particle in which no grain boundary can be confirmed in its external appearance in the SEM image of the particle. The single-particle may have any shape. The single-particle may have a spherical shape, a columnar shape, a lump-like shape, or the like, for example. One single-particle may solely form a first positive electrode active material particle. 2 to 10 single-particles may be aggregated to form a first positive electrode active material particle.

The number of the single-particles included in the first positive electrode active material particle is measured in the SEM image of the first positive electrode active material particle. The magnification of the SEM image is appropriately adjusted in accordance with the size of the particle. The magnification of the SEM image may be, for example, 10000× to 30000×.

It should be noted that, for example, when two single-particles are overlapped with each other in the SEM image of the particle, the particle behind the other may not be confirmed. However, in the present embodiment, the number of single-particles that can be confirmed in the SEM image is regarded as the number of the single-particles included in the first positive electrode active material particle. The same applies to the aggregated particle described later. The first positive electrode active material particle may consist essentially of 1 to 10 single-particles, for example. The first positive electrode active material particle may consist of 1 to 10 single-particles, for example. The first positive electrode active material particle may consist of 1 to 5 single-particles, for example. The first positive electrode active material particle may consist of 1 to 3 single-particles, for example.

The first positive electrode active material particle may consist of 1 single-particle, for example.

The single-particle has a first maximum diameter. The "first maximum diameter" represents a distance between two most distant points on a contour line of the single-particle. In the present embodiment, the "contour line of the particle" may be confirmed in a two-dimensional projection image of the particle, or may be confirmed in a cross sectional image of the particle. The contour line of the particle may be confirmed, for example, in a SEM image of the powder or in a cross sectional SEM image of the particle. The single-particle may have a first maximum diameter of more than or equal to 0.5 μm, for example. The single-particle may have a first maximum diameter of, for example, 3 μm to 7 μm. The average value of the first maximum diameters may be, for example, 3 μm to 7 μm. The average value is the arithmetic average of 100 or more single-particles. The 100 or more single-particles are extracted randomly.

(Second Particle Group/Second Active Material Particles/Aggregated Particles)

The second particle group consists of the plurality of second positive electrode active material particles. Each of the second positive electrode active material particles can have any shape. The second positive electrode active material particle may have a spherical shape, a columnar shape, a lump-like shape, or the like, for example. The plurality of second positive electrode active material particles may have a second average particle size of, for example, 8 μm to 20 μm. The second average particle size may be larger than the first average particle size and a third average particle size (described below). The second average particle size is measured in the SEM image of the second particle group. The plurality of second positive electrode active material particles may have a second average particle size of, for example, 8 μm to 16 μm.

Each of the second positive electrode active material particles includes an aggregated particle. The second positive electrode active material particle may consist essentially of an aggregated particle, for example. The second positive electrode active material particle may consist of an aggregated particle, for example. The aggregated particle is formed by aggregation of 50 or more primary particles (single-crystals). That is, each of the second positive electrode active material particles is a secondary particle obtained by aggregation of 50 or more primary particles. In the present specification, the aggregated particle may be also referred to as "mc (multi-crystal)".

The number of the primary particles included in the aggregated particle is measured in a SEM image of the aggregated particle. The magnification of the SEM image may be, for example, 10000× to 30000×. The aggregated particle may be formed by aggregation of 100 or more primary particles, for example. There is no upper limit for the number of the primary particles in the aggregated particle. The aggregated particle may be formed by aggregation of 10000 or less primary particles, for example. The aggregated particle may be formed by aggregation of 1000 or less primary particles, for example. Each of the primary particles can have any shape. The primary particle may have a spherical shape, a columnar shape, a lump-like shape, or the like, for example.

The "primary particle" in the aggregated particle represents a particle in which no grain boundary can be confirmed in its external appearance in the SEM image of the particle. The primary particle has a second maximum diameter. The "second maximum diameter" represents a distance between two most distant points on a contour line of the primary particle. The second maximum diameter of the primary particle may be smaller than the first maximum diameter of the single-particle, for example. Each of the primary particles may have a second maximum diameter of less than 0.5 μm, for example. The primary particle may have a second maximum diameter of 0.05 μm to 0.2 μm, for example. When each of 10 or more primary particles randomly extracted from the SEM image of one aggregated particle has a second maximum diameter of 0.05 μm to 0.2 μn, all the primary particles included in the aggregated particle can be regarded as each having a second maximum diameter of 0.05 μm to 0.2 μm. Each of the primary particles may have a second maximum diameter of, for example, 0.1 μm to 0.2 μm. The average value of the second maximum diameters may be 0.1 μm to 0.2 μm, for example. The average value represents the arithmetic average of 100 or more primary particles. The 100 or more primary particles are extracted randomly.

(Third Particle Group/Third Positive Electrode Active Material Particles/Single-Particles)

The third particle group consists of the plurality of third positive electrode active material particles. Each of the third positive electrode active material particles includes 1 to 10 single-particles. Details of the single-particles are as described above. The third positive electrode active material particles may be substantially the same as or different from the first positive electrode active material particles. For example, the single-particles included in the third positive electrode active material particles may have substantially the same structure, shape (sphericity or the like), size, chemical composition, and the like as those of the single-particles included in the first positive electrode active material particles. For example, the single-particles included in the third positive electrode active material particles may have structure, shape, size, chemical composition, and the like different from those of the single-particles included in the first positive electrode active material particles. That is, each of the first positive electrode active material particles and the third positive electrode active material particles independently includes 1 to 10 single-particles. The plurality of third positive electrode active material particles may have a third average particle size of 1 μm to 7 μm, for example. The third average particle size is measured in the same manner as the first average particle size.

(Chemical Composition)

Each of the first positive electrode active material particles (single-particles), the second positive electrode active material particles (aggregated particles), and the third positive electrode active material particles (single-particles) may independently have any crystal structure. Each of the positive electrode active material particles may independently have a lamellar structure, a spinel structure, an olivine structure, or the like.

Each of the positive electrode active material particles may independently have any chemical composition. The positive electrode active material particles may have substantially the same chemical composition. The positive electrode active material particles may have chemical compositions different from one another. For example, each of the positive electrode active material particles may independently include at least one selected from a group consisting of $LiCoO_2$, $LiNiO_2$, $LiMnO_2$, $LiMn_2O_4$, $Li(NiCoMn)O_2$, $Li(NiCoAl)O_2$, and $LiFePO_4$. Here, for example, in a composition formula such as "$Li(NiCoMn)O_2$", the total of the composition ratios in the parentheses, (NiCoAl), is 1. The composition ratio of each element (Ni, Co, Mn) is arbitrary as long as the total of the composition ratios is 1.

Each of the positive electrode active material particles may independently include, for example, a lamellar metal oxide.

The lamellar metal oxide may be represented by, for example, the following formula (1):

$$Li_{1-a}Ni_xMe_{1-x}O_2 \quad (1).$$

In the formula (1), "a" satisfies a relation of $-0.3 \leq a \leq 0.3$. "x" satisfies a relation of $0.7 \leq x \leq 1.0$. "Me" represents at least one selected from a group consisting of Co, Mn, Al, Zr, B, Mg, Fe, Cu, Zn, Sn, Na, K, Ba, Sr, Ca, W, Mo, Nb, Ti, Si, V, Cr, and Ge.

For example, each of the positive electrode active material particles may independently include at least one selected from a group consisting of $LiNi_{0.8}Co_{0.1}Mn_{0.1}O_2$, $LiN_{0.7}Co_{0.2}Mn_{0.1}O_2$, $LiNi_{0.7}Co_{0.1}Mn_{0.2}O_2$, $LiNi_{0.6}Co_{0.3}Mn_{0.1}O_2$, $LiNi_{0.6}Co_{0.2}Mn_{0.2}O_2$, and $LiNi_{0.6}Co_{0.1}Mn_{0.3}O_2$.

For example, each of the positive electrode active material particles may independently include at least one selected from a group consisting of $LiNi_{0.8}Co_{0.1}Mn_{0.1}O_2$, $LiN_{0.7}Co_{0.2}Mn_{0.1}O_2$.

(Bite Ratio)

The bite ratio quantifies to what degree the first particle group bites into positive electrode substrate 11 in first layer 1 (lower layer). As the bite ratio is higher, the first particle group is regarded as biting deeper into positive electrode substrate 11. The bite ratio is found by the following formula (2):

$$B(\%) = d/t \times 100 \quad (2).$$

In the formula (2), "B" represents the bite ratio. "d" represents an average value of depths of portions of positive electrode substrate 11, the portions of positive electrode substrate 11 being portions into which the first positive electrode active material particles bite in a thickness direction of positive electrode substrate 11. "t" represents a thickness of positive electrode substrate 11.

Figure 4:
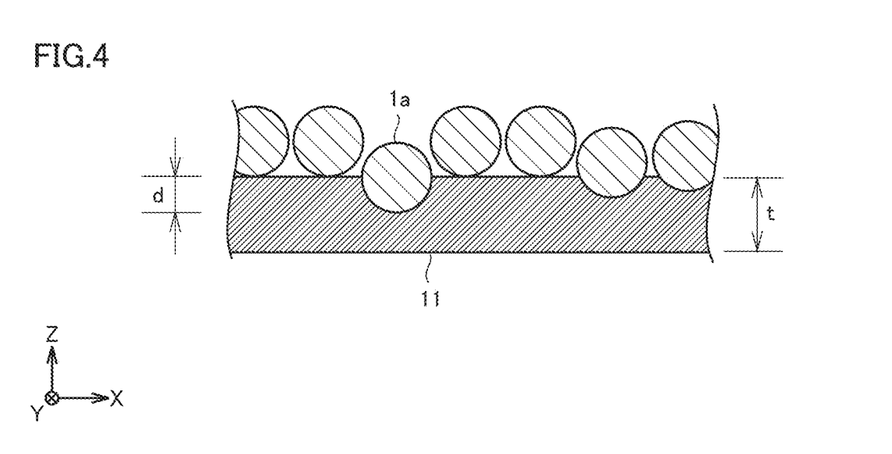
FIG. 4 is an explanatory diagram of a method of measuring a bite ratio.

FIG. 4 is an explanatory diagram of a method of measuring the bite ratio.

A cross sectional sample is sampled from positive electrode 10. The cross sectional sample includes an observation target surface that is parallel to the thickness direction (Z axis direction in FIG. 4) of positive electrode substrate 11. The observation target surface is subjected to CP (cross section polisher) processing. For example, a cross sectional sample production device "product name: SM-09020CP" manufactured by JEOL or the like may be used. A device having a function equivalent to that of the foregoing device may be used. Processing conditions can be as follows.

Argon beam acceleration voltage: 6 kV
Ionic current: 120 μA
Processing time: 6 h
Milling speed: 200 μm/h After the CP processing, the cross sectional sample is observed using a SEM. For example, a field emission scanning electron microscope (field emission-SEM; FE-SEM) "product name: JSM-7600F" manufactured by JEOL or the like may be used. An FE-SEM having a function equivalent to that of the foregoing device may be used. A SEM image are obtained at a magnification of 5000×. The SEM image includes an interface between positive electrode substrate 11 and first layer 1. In the SEM image, first positive electrode active material particles 1a biting into positive electrode substrate 11 are extracted. The depths of the portions of positive electrode substrate 11 into which first positive electrode active material particles 1a bite in the thickness direction of positive electrode substrate 11 are measured. The depths are measured for 20 randomly extracted first positive electrode active material particles 1a. The arithmetic average of the 20 depths is regarded as "d" in the formula (2) above. The thickness of positive electrode substrate 11 is measured at a portion at which positive electrode substrate 11 is not compressed. The thickness of positive electrode substrate 11 is measured using a thickness gauge. The arithmetic average of three measurement results is regarded as "t" in the formula (2) above.

The first particle group may have a bite ratio of, for example, 9.3% to 21.3%. Since the bite ratio is more than or equal to 9.3%, it is expected to improve the fusing performance. When the bite ratio is more than 21.3%, the strength of positive electrode substrate 11 may be decreased. This may cause a trouble in an operation of welding positive electrode substrate 11 to positive electrode current collecting member 71, for example. The first particle group may have, for example, a bite ratio of more than or equal to 12.1%, a bite ratio of more than or equal to 12.6%, or a bite ratio of more than or equal to 14.4%. The first particle group may have, for example, a bite ratio of less than or equal to 19.9%, a bite ratio of less than or equal to 18.2%, or a bite ratio of less than or equal to 16.2%.

(Sphericity)

The "sphericity" in the present specification is measured by a particle image analysis device. For example, a particle image analysis device "product name: Morphologi G3" manufactured by Malvern Panalytical or the like may be used. A particle image analysis device having a function equivalent to that of the foregoing device may be used. A two-dimensional projection image of 100 or more particles is obtained by the particle image analysis device. The circularity of each of the particles is found. The circularity of each of the particles is found by the following formula (3):

$$\text{Circularity} = 4\pi S/L^2 \quad (3).$$

In the formula (3), "S" represents the area of the particle image, and "L" represents the peripheral length of the particle image. The area of the particle image is found from, for example, the number of pixels of the particle image. A frequency distribution (number-based) of circularities is created. In the frequency distribution, the most frequent circularity is regarded as the "sphericity". When the sphericity is 1, the particle is theoretically regarded as an exact sphere.

The first particle group (single-particles) may have a sphericity of, for example, 0.75 to 0.87. Since the first particle group has a sphericity of 0.75 to 0.87, a desired bite ratio tends to be likely to be obtained. It should be noted that the second particle group (aggregated particles) may have a sphericity of 0.90 to 0.97, for example. The second particle group may have a sphericity of, for example, 0.96 to 0.97.

(Mixing Ratio of Second Particle Group and Third Particle Group)

Second layer 2 includes the mixture of the second particle group and the third particle group. The mixing ratio of the second particle group and the third particle group may be, for example, as follows: "second particle group/third particle group=50/50 to 75/25 (mass ratio)". The mixing ratio of the second particle group and the third particle group may be, for example, as follows: "second particle group/third particle group=60/40 to 70/30 (mass ratio)". With these mixing ratios, it is expected to improve the packing characteristic.

(Flow Function Coefficient, $ff_c$)

The mixture of the second particle group and the third particle group may have an $ff_c$ of more than or equal to 2.9, for example. When the mixture of the second particle group and the third particle group has an $ff_c$ of more than or equal to 2.9, the packing characteristic of positive electrode active material layer 12 is expected to be improved. The $ff_c$ may be more than or equal to 3.0, more than or equal to 3.5, more than or equal to 4.3, more than or equal to 5.1, or more than or equal to 8.2, for example. The $ff_c$ may be less than or equal to 8.2, or less than or equal to 5.1, for example.

The $ff_c$ can be adjusted in accordance with the mixing ratio of the second particle group and the third particle group, for example. Further, for example, by mixing the second particle group and the third particle group with each other using a tumbling fluidized-bed dry mixing device, the $ff_c$ tends to be large. A drying temperature during the mixing may be, for example, about 150° C.

The $ff_c$ is measured by a direct shear test for powders. A constant-volume shear test device is prepared. For example, a powder-layer shear measurement device "NS-S500 type" manufactured by Nano Seeds Corporation or the like may be prepared. A device having a function equivalent to that of the foregoing device may be prepared.

Figure 5:
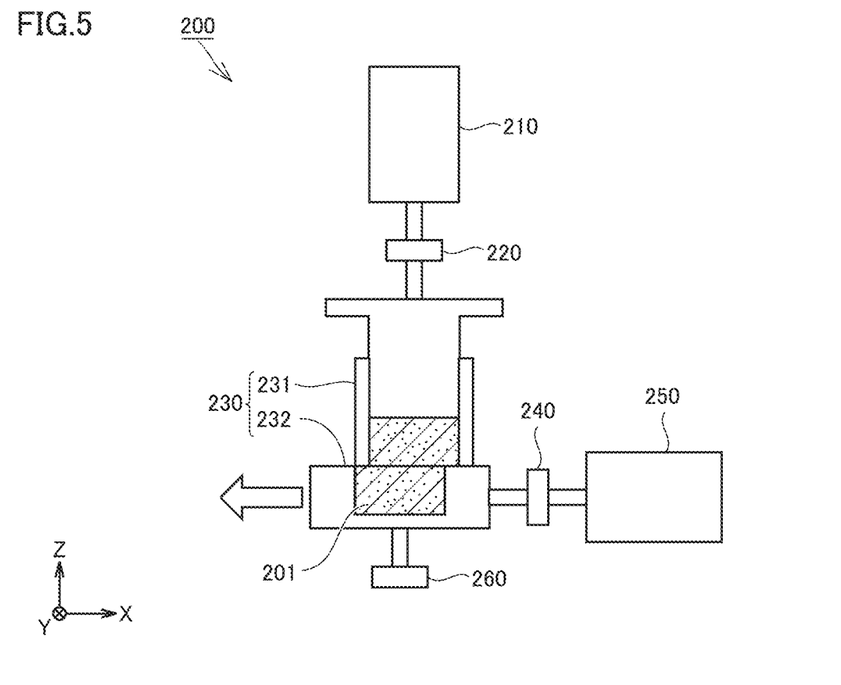
FIG. 5 is a first explanatory diagram of a direct shear test for powders.

FIG. 5 is a first explanatory diagram of a direct shear test for powders.

A test device 200 includes a servo cylinder 210, a first load cell 220, a sample cell 230, a second load cell 240, a linear actuator 250, and a third load cell 260. The powder (measurement target) is provided in sample cell 230. In this way, a powder layer 201 is formed. Sample cell 230 has a cylindrical shape. Sample cell 230 includes an upper cell 231 and a lower cell 232. Sample cell 230 is divided into upper cell 231 and lower cell 232.

Servo cylinder 210 applies, to the powder, a load in a vertical direction (Z axis direction). Thus, normal stress is generated to consolidate powder layer 201. Upper cell 231 is fixed. Linear actuator 250 moves lower cell 232 in a horizontal direction (X axis direction). Thus, powder layer 201 undergoes shear collapse.

Figure 6:
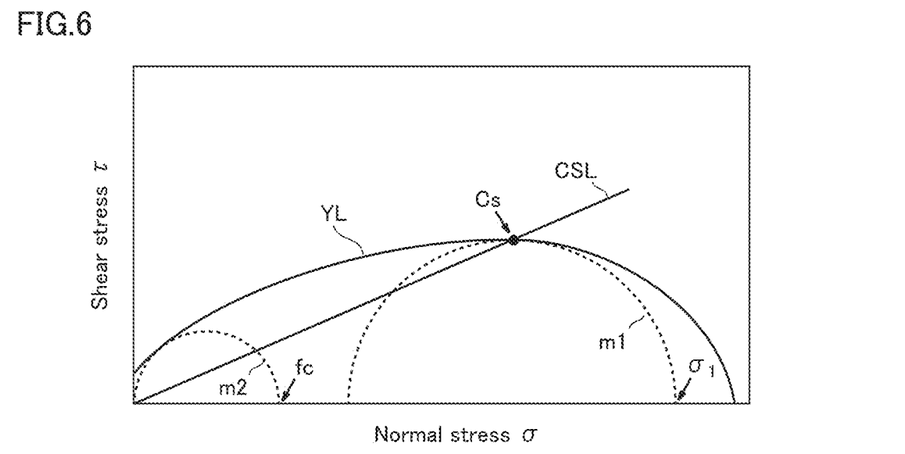
FIG. 6 is a second explanatory diagram of the direct shear test for powders.

FIG. 6 is a second explanatory diagram of the direct shear test for powders.

Uniaxial collapse stress ($f_c$) and maximum principal stress ($\sigma_1$) are derived from normal stress ($\sigma$) and shear stress ($\tau$) in the direct shear test for powders. In the orthogonal coordinates of FIG. 6, the normal stress ($\sigma$) is indicated in the horizontal axis, and the shear stress ($\tau$) is indicated in the vertical axis. First, a yield locus (YL) is drawn. The shear stress ($\tau$) is gradually exerted onto an arbitrary plane in powder layer 201 in the horizontal direction with the normal stress ($\sigma$) being applied to the plane. Due to the shear stress ($\tau$), the plane in powder layer 201 starts to undergo collapse. This is a critical stress state. The normal stress ($\sigma$) and the shear stress ($\tau$) in the critical stress state are plotted. In this way, the yield locus (YL) is drawn. Then, a critical state line (CSL) is drawn. After the shear collapse, the shear stress ($\tau$) is changed temporarily but finally has a constant value. The shear stress ($\tau$) having the constant value as well as the normal stress ($\sigma$) on that occasion are plotted. In this way, the critical state line (CSL) is drawn. The critical state line (CSL) is a straight line extending through the origin.

An intersection point between the yield locus (YL) and the critical state line (CSL) represents a critical state (Cs). A Mohr's stress circle (m1) is drawn to extend through the critical state (Cs) and be tangent to the yield locus (YL). Of intersection points between the Mohr's stress circle (m1) and the horizontal axis, the one having a larger value is the maximum principal stress ($\sigma_1$). A Mohr's stress circle (m2) is drawn to extend through the origin and be tangent to the yield locus (YL). An intersection point (other than the origin) between the Mohr's stress circle (m2) and the horizontal axis is the uniaxial collapse stress ($f_c$). The $ff_c$ can be found by the following formula (4):

$$ff_c = \sigma_1 / f_c \qquad (4).$$

The $ff_c$ is measured three or more times. The arithmetic average value of the three or more results is regarded as the $ff_c$ of the measurement target. The $ff_c$ (average value) is effective up to the first decimal place. The second and subsequent decimal places are rounded off.

The direct shear test for powders is performed in accordance with "JIS Z8835: Direct shear testing method for critical state line (CSL) and wall yield locus (WYL) of powder bed". Specific test conditions can be, for example, as follows.

Amount of sample: 10.0 g
Sampling cycle: 10 Hz
Final thickness of powder layer: 5.00 mm
Inner diameter of sample cell: 15 mm
Pressing speed: 0.20 mm/s
Pressing load: 150 N
Lateral sliding speed: 10 μm/s
Measurement time: 280 s
Measurement temperature: 28° C.±1° C.

(Ratio of Cracked Aggregated Particles)

When the mixture of the second particle group and the third particle group exhibits a high packing characteristic, a ratio of cracked aggregated particles after compression can be reduced in second layer 2. By the reduction of the ratio of cracked aggregated particles, it is expected to improve the cycle durability or the like, for example. The ratio of cracked aggregated particles may be, for example, less than or equal to 10%, less than or equal to 5%, or substantially 0%. Whether or not an aggregated particle is cracked can be confirmed in the cross sectional SEM image of positive electrode active material layer 12. The confirmation of cracking is performed for 100 or more aggregated particles. The ratio of the cracked particles is found by dividing the number of cracked particles by the total number of confirmed particles.

(Thickness Ratio)

The ratio of the thickness of second layer 2 to the thickness of positive electrode active material layer 12 may be, for example, 0.2 to 0.8. The thickness ratio may be, for example, 0.25 to 0.75. When the thickness ratio is 0.25 to 0.75, balance tends to be excellent between the fusing performance and the cycle durability, for example. The thickness ratio may be, for example, 0.25 to 0.5 or 0.5 to 0.75. The thickness (T0) of positive electrode active material layer 12 and the thickness (T2) of second layer 2 are measured in the following procedure.

From positive electrode 10, 10 or more cross sectional samples are sampled. Each of the cross sectional samples is sampled from a randomly extracted position. The cross sectional sample includes an observation target surface parallel to the thickness direction (Z axis direction in FIG. 3) of positive electrode active material layer 12. The observation target surface is subjected to CP processing. Details of the CP processing are as described above. After the CP processing, each cross sectional sample is observed by SEM. Thus, 10 or more cross sectional SEM images are obtained.

In the cross sectional SEM image, an aggregated particle is extracted from a position furthest away from the surface (S1) of positive electrode active material layer 12 in the thickness direction (Z axis direction) of positive electrode active material layer 12 (see FIG. 3). The shortest distance between the tip of the extracted aggregated particle and the surface (S1) is measured. This shortest distance is regarded as the thickness (T2) of second layer 2.

In the cross sectional SEM image, the shortest distance between the surface (S1) of positive electrode active material layer 12 and the surface (S2) of positive electrode substrate 11 is measured at an arbitrary position (see FIG. 3). The shortest distance is regarded as the thickness (T0) of positive electrode active material layer 12. The thickness ratio is found by dividing the thickness (T2) of second layer 2 by the thickness (T0) of positive electrode active material layer 12. The thickness ratio is found in each of 10 or more cross sectional SEM images. The arithmetic average of the 10 or more measurement results is employed.

<<Negative Electrode>>

Negative electrode 20 may include a negative electrode substrate 21 and a negative electrode active material layer 22, for example. Negative electrode substrate 21 is an electrically conductive sheet. Negative electrode substrate 21 may be, for example, a Cu alloy foil or the like. Negative electrode substrate 21 may have a thickness of, for example, 5 μm to 30 μm. Negative electrode active material layer 22 may be disposed on a surface of negative electrode substrate 21. Negative electrode active material layer 22 may be disposed only on one surface of negative electrode substrate 21, for example. Negative electrode active material layer 22 may be disposed on each of the front and rear surfaces of negative electrode substrate 21, for example. Negative electrode substrate 21 may be exposed at one end portion in the width direction of negative electrode 20 (X axis direction in FIG. 2). Negative electrode current collecting member 72 can be joined to the exposed portion of negative electrode substrate 21.

Negative electrode active material layer 22 may have a thickness of, for example, 10 μm to 200 μm. Negative electrode active material layer 22 includes a negative electrode active material. The negative electrode active material may include any component. The negative electrode active material may include, for example, at least one selected from a group consisting of graphite, soft carbon, hard carbon, silicon, silicon oxide, a silicon-based alloy, tin, tin oxide, a tin-based alloy, and a lithium-titanium composite oxide.

Negative electrode active material layer 22 may further include, for example, a binder or the like in addition to the negative electrode active material. For example, negative electrode active material layer 22 may include: 95% to 99.5% of the negative electrode active material in mass fraction; and the remaining of the binder. The binder may include any component. The binder may include, for example, at least one selected from a group consisting of carboxymethyl cellulose (CMC) and styrene-butadiene rubber (SBR).

<<Separator>>

At least a portion of separator 30 is interposed between positive electrode 10 and negative electrode 20. Separator 30 separates positive electrode 10 and negative electrode 20 from each other. Separator 30 may have a thickness of, for example, 10 μm to 30 μm.

Separator 30 is a porous sheet. Separator 30 permits the electrolyte solution to pass therethrough. Separator 30 may have an air permeability of, for example, 200 s/100 mL to 400 s/100 mL. In the present specification, the "air permeability" represents "Air Resistance" defined in "JIS P 8117: 2009". The air permeability is measured by the Gurley test method.

Separator 30 is electrically insulative. Separator 30 may include, for example, a polyolefin-based resin or the like. Separator 30 may consist essentially of a polyolefin-based resin, for example. The polyolefin-based resin may include at least one selected from a group consisting of polyethylene (PE) and polypropylene (PP), for example. Separator 30 may have a single-layer structure, for example. Separator 30 may consist essentially of a PE layer, for example. Separator 30 may have a multilayer structure, for example. Separator 30 may be formed by layering a PP layer, a PE layer, and a PP layer in this order, for example. A heat-resistant layer or the like may be formed on the surface of separator 30, for example.

<<Electrolyte Solution>>

The electrolyte solution includes a solvent and a supporting electrolyte. The solvent is aprotic. The solvent can include any component. The solvent may include, for example, at least one selected from a group consisting of ethylene carbonate (EC), propylene carbonate (PC), butylene carbonate (BC), dimethyl carbonate (DMC), ethyl methyl carbonate (EMC), diethyl carbonate (DEC), 1,2-dimethoxyethane (DME), methyl formate (MF), methyl acetate (MA), methyl propionate (MP), and γ-butyrolactone (GBL).

The supporting electrolyte is dissolved in the solvent. For example, the supporting electrolyte may include at least one selected from a group consisting of $LiPF_6$, $LiBF_4$, and $LiN(FSO_2)_2$. The supporting electrolyte may have a molar concentration of, for example, 0.5 mol/L to 2.0 mol/L. The supporting electrolyte may have a molar concentration of, for example, 0.8 mol/L to 1.2 mol/L.

The electrolyte solution may further include any additive in addition to the solvent and the supporting electrolyte. For example, the electrolyte may include the additive having a mass fraction of 0.01% to 5%. The additive may include, for example, at least one selected from a group consisting of vinylene carbonate (VC), lithium difluorophosphate ($LiPO_2F_2$), lithium fluorosulfonate ($FSO_3Li$), and lithium bis[oxalatoborate] (LiBOB).

Examples

Hereinafter, an example of the present technology (also referred to as "the present example" in the present specification) will be described. However, the scope of the present technology is not restricted to the following description.

<Manufacturing of Nonaqueous Electrolyte Secondary Battery>

Test batteries (nonaqueous electrolyte secondary batteries) according to No. 1 to No. 13 were manufactured in the following procedure.

Two types of single-particles (sc1 and sc2) were prepared.

sc1: D50=3.2 μm and sphericity=0.87 sc2: D50=4.5 μm and sphericity=0.75

Each of sc1 and sc2 had a chemical composition of $LiNi_{0.8}Co_{0.1}Mn_{0.1}O_2$. sc1 was synthesized under conditions different from those for sc2. That is, sc1 was calcined at 800° C. for 48 hours. sc2 was calcined at 900° C. for 48 hours. D50 in the present specification represents a particle size corresponding to a cumulative particle volume of 50% from the smallest particle size with respect to the entirety thereof in a volume-based particle size distribution.

Two types of aggregated particles (mc1 and mc2) were prepared.

mc1: D50=12.8 μm and sphericity=0.96
mc2: D50=13.4 μm and sphericity=0.97

Each of mc1 and mc2 had a chemical composition of $LiNi_{0.8}Co_{0.1}Mn_{0.1}O_2$.

As shown in Table 1 below, a first layer material was prepared by selecting single-particles or aggregated particles.

A second layer material (powder mixture) was prepared by mixing the single-particles and the aggregated particles using a tumbling fluidized-bed dry mixing device. Combinations of the single-particles and the aggregated particles in the samples are shown in Table 1 below. In the column for the second layer in Table 1, "sc1+mc1" indicates that sc1 and mc1 are mixed, for example, as follows: "sc1/mc1=50/50 (mass ratio)". The mixing ratios in the samples were the same.

The following materials were prepared.
Conductive material: graphite
Binder: PVdF (powder form)
Dispersion medium: N-methyl-2-pyrrolidone (NMP)
Positive electrode substrate: Al foil A first slurry was prepared by mixing the first layer material, the conductive material, the binder, and the dispersion medium. The first slurry was applied onto the positive electrode substrate and was dried, thereby forming the first layer.

A second slurry was prepared by mixing the second layer material, the conductive material, the binder, and the dispersion medium. The second slurry was applied onto the first layer and was dried, thereby forming the second layer.

In this way, the positive electrode active material layer was formed. The positive electrode active material layer was compressed by a rolling machine. Thus, a positive electrode raw sheet was manufactured. The positive electrode raw sheet is cut into a predetermined size, thereby manufacturing the positive electrode. The thickness ratio and the bite ratio were measured by the methods described above. Further, a test battery including the positive electrode was manufactured.

Evaluations

<<Nail Penetration Test>>

The test battery was charged. The test battery was connected to a data logger. The data logger has a voltage measurement function and a current measurement function. A nail (manufactured by DAIDOHANT; a circular nail with a body diameter=3 mm) was prepared. The test battery was penetrated by the nail. When voltage drop was confirmed, the penetration by the nail was halted. After the halt of the nail, voltage and current were measured until voltage increase was detected. It is considered that the voltage drop indicates occurrence of a short circuit. It is considered that the voltage increase after the voltage drop indicates that the positive electrode substrate (Al foil) around the nail is melted by Joule heat resulting from the short circuit and is spread to interrupt the current. An amount of generated heat was calculated in accordance with the voltage, current, and time until the voltage increase was detected. It is considered that as the amount of generated heat is smaller, the fusing performance is more excellent.

<<Cycle Test>>

Under a temperature environment of 60° C., charging/discharging was repeated 500 cycles. One cycle represents one round of below-described CCCV charging and CC discharging.

CCCV charging: CC current=0.5 It; CV voltage=4.2 V; 0.02 It cut-off
CC discharging: CC current=0.5 It; 2.5 V cut-off The "CCCV charging" indicates constant current-constant voltage charging. The "CC current" indicates a current during constant current charging. The "CV voltage" indicates a voltage during constant voltage charging. The constant voltage charging was ended when the current is decayed to 0.02 It. The "CC discharging" indicates constant current discharging. The constant current discharging was ended when the voltage reached 2.5 V. "It" is a sign representing an hour rate of current. A current of 1 It is defined as a current with which the rated capacity of the test battery is discharged in one hour.

A resistance increase ratio (percentage) was found by dividing a battery resistance after the cycle test by a battery resistance before the cycle test. It is considered that as the resistance increase ratio is lower, the cycle durability is more excellent.

TABLE 1

| | Positive Electrode Active Material Layer | | | | | Evaluations | | |
|---|---|---|---|---|---|---|---|---|
| | Second Layer | First Layer | Thickness Ratio[2]) | After Compression | | Nail Penetration Test | | Cycle Test |
| | Upper Layer[1]) | Lower Layer | T2/T0 [—] | Density [g/cm³] | Bite Ratio [%] | Generation of Gas | Amount of Generated Heat [J] | Resistance Increase Ratio [%] |
| 1 | mc1 | —[3]) | 1 | 3.72 | 4.4 | Generated | 6.4 | 268 |
| 2 | sc1 + mc1 | —[3]) | 1 | 3.82 | 7.8 | Generated | 5.5 | 149 |
| 3 | mc1 + mc2 | sc1 | 0.5 | 3.66 | 13.1 | Not Generated | 1.5 | 255 |
| 4 | sc1 + mc1 | mc1 | 0.5 | 3.76 | 8.5 | Generated | 6.1 | 166 |
| 5 | sc1 + mc1 | sc1 | 0.5 | 3.75 | 12.6 | Not Generated | 1.4 | 132 |
| 6 | sc1 + mc1 | sc1 | 0.2 | 3.67 | 16.2 | Not Generated | 1.9 | 159 |
| 7 | sc1 + mc1 | sc1 | 0.25 | 3.70 | 14.4 | Not Generated | 1.8 | 153 |
| 8 | sc1 + mc1 | sc1 | 0.75 | 3.71 | 19.9 | Not Generated | 1.4 | 156 |
| 9 | sc1 + mc1 | sc1 | 0.8 | 3.69 | 21.3 | Not Generated | 1.3 | 155 |
| 10 | sc1 + mc1 | sc1 | 0.5 | 3.65 | 9.3 | Not Generated | 1.6 | 122 |

TABLE 1-continued

| | Positive Electrode Active Material Layer | | | | | Evaluations | | | |
|---|---|---|---|---|---|---|---|---|---|
| | Second Layer | First Layer | Thickness Ratio[2] | After Compression | | Nail Penetration Test | | Cycle Test | |
| | Upper Layer[1] | Lower Layer | T2/T0 [—] | Density [g/cm$^3$] | Bite Ratio [%] | Generation of Gas | Amount of Generated Heat [J] | Resistance Increase Ratio [%] | |
| 11 | sc1 + mc1 | sc1 | 0.5 | 3.81 | 16.2 | Not Generated | 1.5 | 140 | |
| 12 | sc2 + mc1 | sc1 | 0.5 | 3.76 | 12.1 | Not Generated | 1.6 | 138 | |
| 13 | sc1 + mc1 | sc2 | 0.5 | 3.73 | 18.2 | Not Generated | 0.9 | 136 | |

[1]"sc1": single-particles, $LiNi_{0.8}Co_{0.1}Mn_{0.1}O_2$, D50 = 3.2 μm, sphericity = 0.87
"sc2": single-particles, $LiNi_{0.8}Co_{0.1}Mn_{0.1}O_2$, D50 = 4.5 μm, sphericity = 0.75
"mc1": aggregated particles, $LiNi_{0.8}Co_{0.1}Mn_{0.1}O_2$, D50 = 12.8 μm, sphericity = 0.96
"mc2": aggregated particles, $LiNi_{0.8}Co_{0.1}Mn_{0.1}O_2$, D50 = 13.4 μm, sphericity = 0.97
[2]The thickness ratio represents a ratio of the thickness (T2) of the second layer to the thickness (T0) of the positive electrode active material layer.
[3]The positive electrode active material layer of each of No. 1 and No. 2 had a single-layer structure. The other samples had two-layer structures.

Results

As shown in Table 1, when the second layer (upper layer) includes the mixture of the single-particles and the aggregated particles and the first layer (lower layer) includes the single-particles, it is seen that the packing characteristic of the positive electrode active material layer and the fusing performance tend to be excellent. Further, samples satisfying the condition tend to have excellent cycle durability.

In each of the results of No. 12 and No. 13, the single-particles having a low sphericity are disposed in the first layer, with the result that the fusing performance tends to be improved.

The present embodiment and the present example are illustrative in any respects. The present embodiment and the present example are not restrictive. The scope of the present technology includes any modifications within the scope and meaning equivalent to the terms of the claims. For example, it is initially expected to extract freely configurations from the present embodiment and the present example and combine them freely. When functions and effects are stated in the present embodiment and the present example, the scope of the present technology is not restricted to such a range that all the function and effects are exhibited.

What is claimed is:

1. A nonaqueous electrolyte secondary battery comprising:
    a positive electrode;
    a negative electrode; and
    an electrolyte solution, wherein
    the positive electrode includes a positive electrode substrate and a positive electrode active material layer,
    the positive electrode active material layer is disposed on a surface of the positive electrode substrate,
    the positive electrode active material layer includes a first layer and a second layer,
    the first layer is disposed between the second layer and the positive electrode substrate,
    the first layer includes a first particle group as a main active material,
    the second layer includes a mixture of a second particle group and a third particle group,
    the second particle group is a main active material of the second layer,
    the first particle group consists of a plurality of first positive electrode active material particles,
    the second particle group consists of a plurality of second positive electrode active material particles,
    the third particle group consists of a plurality of third positive electrode active material particles,
    each of the first positive electrode active material particles and the third positive electrode active material particles independently includes 1 to 10 single-particles, and
    each of the second positive electrode active material particles includes a secondary particle obtained by aggregation of more than 100 primary particles, wherein
    the surface of the positive electrode substrate includes a first region and a second region,
    the positive electrode active material is disposed on the first region,
    the first region has a bite ratio of 9.3% to 21.3%,
    the second region of the positive electrode substrate is exposed by the positive electrode active material layer,
    the second region is flat,
    the bite ratio is found by the following formula (2):

$$B (\%) = d/t \times 100 \qquad (2),$$ where

B represents the bite ratio,
    d represents an average value of depths of portions of the positive electrode substrate, the portions of the positive electrode substrate being portions into which the first positive electrode active material particles bite in a thickness direction of the positive electrode substrate, and
    t represents a thickness of the positive electrode substrate.

2. The nonaqueous electrolyte secondary battery according to claim 1, wherein
    each of the first positive electrode active material particles, the second positive electrode active material particles, and the third positive electrode active material particles independently includes a lamellar metal oxide, and
    the lamellar metal oxide is represented by the following formula (1):

$$Li_{1-a}Ni_xMe_{1-x}O_2 \qquad (1),$$ where a satisfies a relation of $-0.3 \leq a \leq 0.3$,
    x satisfies a relation of $0.7 \leq x \leq 1.0$, and
    Me represents at least one selected from a group consisting of Co, Mn, Al, Zr, B, Mg, Fe, Cu, Zn, Sn, Na, K, Ba, Sr, Ca, W, Mo, Nb, Ti, Si, V, Cr, and Ge.

3. The nonaqueous electrolyte secondary battery according to claim 1, wherein the first particle group has a sphericity of 0.75 to 0.87.

4. The nonaqueous electrolyte secondary battery according to claim 1, wherein the mixture has a flow function coefficient of more than or equal to 2.9.

5. The nonaqueous electrolyte secondary battery according to claim 1, wherein a ratio of a thickness of the second layer to a thickness of the positive electrode active material layer is 0.25 to 0.75.

* * * * *